United States Patent [19]

Shiau

[11] 4,148,010
[45] Apr. 3, 1979

[54] MAGNETIC INK CHARACTER READER SYSTEM

[75] Inventor: Chin-Chih Shiau, Kitchner, Canada

[73] Assignee: NCR Canada Ltd. - NCR Canada Ltee, Mississauga, Canada

[21] Appl. No.: 846,878

[22] Filed: Oct. 31, 1977

[51] Int. Cl.$^2$ ............................................. G06K 9/18
[52] U.S. Cl. .............................. 340/146.3 C; 235/466
[58] Field of Search ................. 340/146.3 C, 146.3 H, 340/146.3 R; 235/466, 474

[56] References Cited

U.S. PATENT DOCUMENTS

| | | | |
|---|---|---|---|
| 3,316,536 | 4/1967 | Andrews et al. | 340/146.3 C |
| 3,418,633 | 12/1968 | Jones et al. | 340/146.3 C |
| 3,528,058 | 9/1970 | Bond | 340/146.3 C |
| 3,906,202 | 9/1975 | Meyer | 340/146.3 Z |
| 3,987,278 | 10/1976 | Van Elzakker et al. | 235/466 |

Primary Examiner—Leo H. Boudreau

Attorney, Agent, or Firm—J. T. Cavender; Wilbert Hawk, Jr.; Richard W. Lavin

[57] ABSTRACT

A magnetic character reader system for reading and identifying magnetized characters printed on a document such as a check, in which analog waveforms derived from scanning the characters are analyzed by rectifying and integrating the waveform to generate a value representing the gain of a programmable gain amplifier for use in amplifying the waveform to compensate for variations in ink intensity. Means are provided for generating a value representing the center of gravity of the area under each peak of the amplified waveform for use in retiming the peak sampling windows for compensating for variations in the speed of the document past the magnetic read head. Digital values representing the area under each peak curve in the waveform are compared with corresponding values of a plurality of reference characters to identify the unknown character.

23 Claims, 16 Drawing Figures

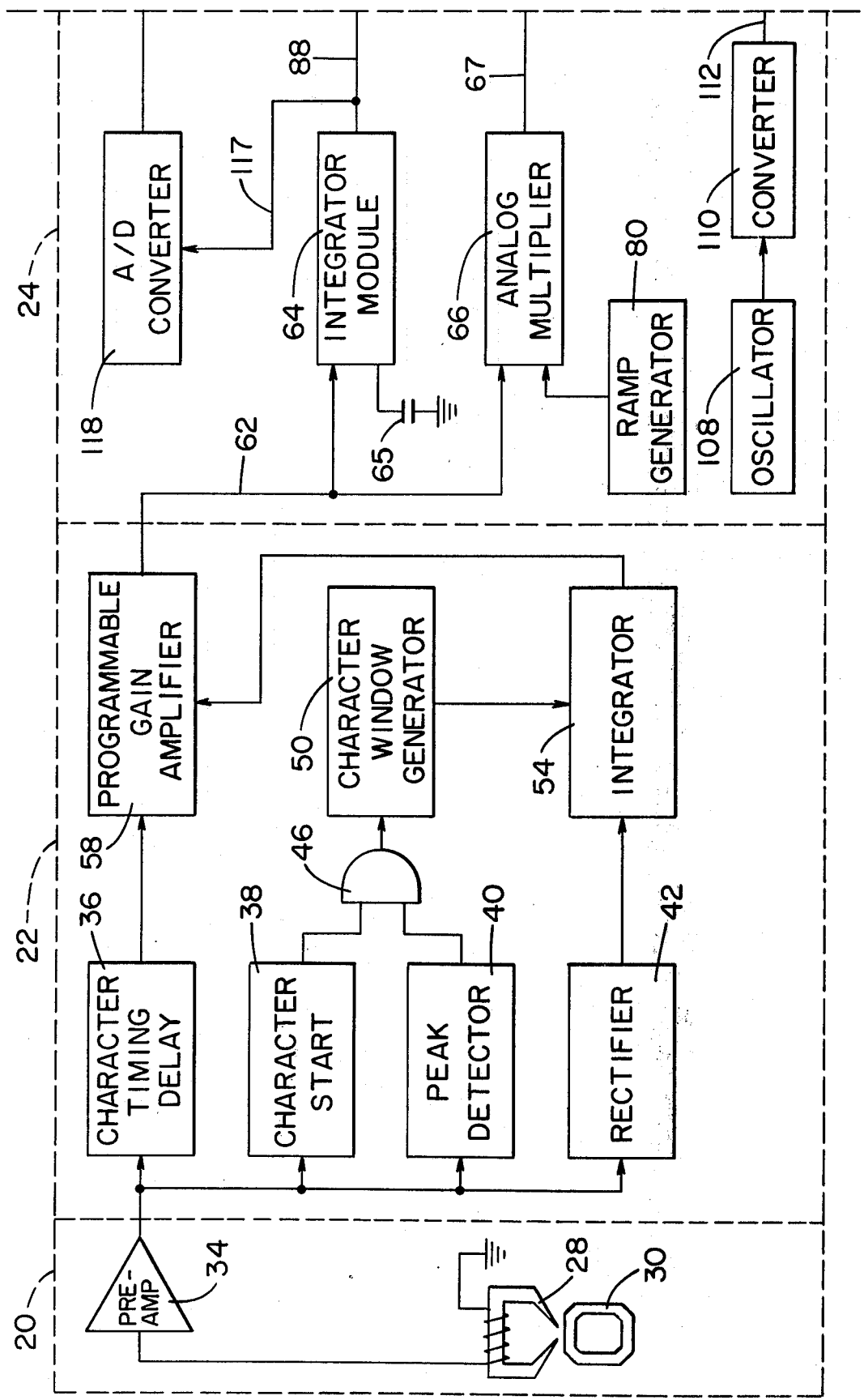
FIG. IA

FIG. 2
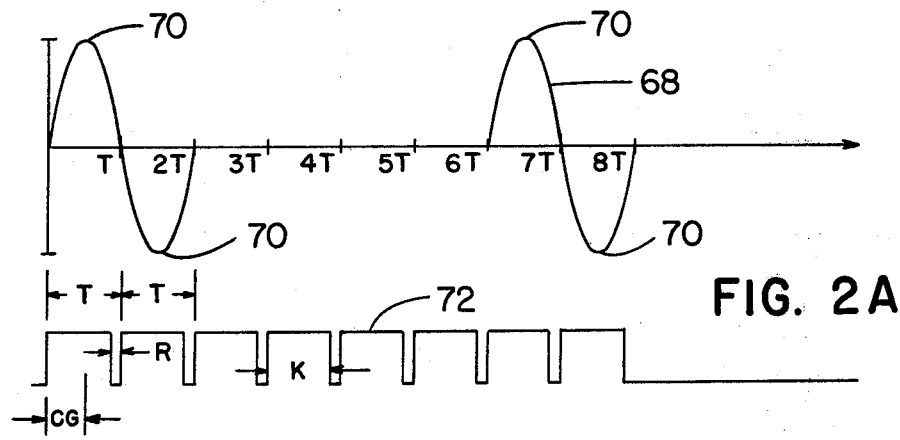
FIG. 2A
FIG. 3
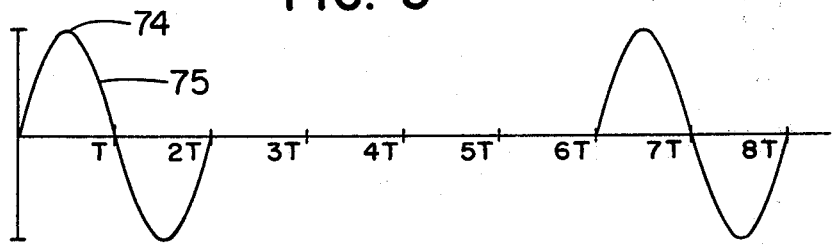
FIG. 3A
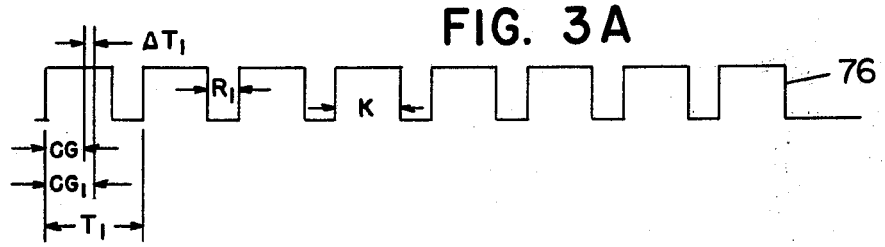
FIG. 5
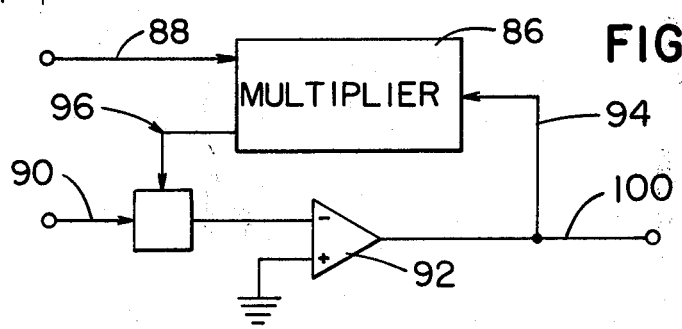

FIG. 10

| WINDOW NUMBER | 1 | 2 | 3 | 4 | 5 | 6 | 7 | 8 |
|---|---|---|---|---|---|---|---|---|
| SAMPLE VALUES | 30 | -22 | 0 | 0 | 0 | 0 | 20 | -23 |

FIG. 11

| WINDOW NUMBER | 1 | 2 | 3 | 4 | 5 | 6 | 7 | 8 |
|---|---|---|---|---|---|---|---|---|
| SAMPLE VALUES OF MEAN "0" | 26 | -14 | 0 | 0 | 0 | 0 | 19 | -19 |
| SAMPLE VALUES OF MEAN "1" | 19 | 0 | 25 | -8 | -20 | 0 | 0 | 0 |
| SAMPLE VALUES OF MEAN "2" | 28 | -9 | 0 |  | -22 | 0 | 0 | 0 |
| SAMPLE VALUES OF MEAN "3" | 21 | 21 | -19 | 0 | 0 | 11 | 0 | 0 |
| SAMPLE VALUES OF MEAN "4" | 17 | 0 | -8 | 0 | 23 | 3 | -22 | 0 |
| SAMPLE VALUES OF MEAN "5" | 28 | -9 | 0 | 0 | 16 | -21 | 0 | 0 |
| SAMPLE VALUES OF MEAN "6" | 15 | -2 | 9 | 0 | 0 | 23 | -25 | 0 |
| SAMPLE VALUES OF MEAN "7" | 18 | -6 | 18 | -16 | 10 | -9 | 0 | 0 |
| SAMPLE VALUES OF MEAN "8" | 13 | 15 | -13 | 0 | 0 | -19 | -8 | -10 |
| SAMPLE VALUES OF MEAN "9" | 34 | -4 | -11 | 0 | 0 | 13 | -15 | 0 |
| SAMPLE VALUES OF MEAN "$Q_1$" | 14 | 0 | -11 | 15 | -13 | 12 | 0 | -10 |
| SAMPLE VALUES OF MEAN "$Q_2$" | 11 | 0 | 0 | -9 | 16 | -13 | 16 | -12 |
| SAMPLE VALUES OF MEAN "$Q_3$" | 20 | 0 | 1 | -15 | 0 | 18 | 0 | -15 |
| SAMPLE VALUES OF MEAN "$Q_4$" | 15 | -12 | 13 | 0 | 12 | 13 | 0 | -10 |

MAGNETIC INK CHARACTER READER SYSTEM

BACKGROUND OF THE INVENTION

This invention relates to a magnetic character recognition system and, more particularly, to a document reader system in which a single gap magnetic read head is used for reading magnetized characters embodied in the form of E-13B character font printed on a document.

In single-gap magnetic character reading systems, a single analog input waveform is obtained by passing the characters to be sensed, normally printed on a document, beneath a magnetic read head at least as wide as the height of the characters and having a single flux gap. The signal generated by the read head is a derivative waveform representing the rate of change of magnetic flux traversing the head as the characters are scanned. Since the distribution of ink, and thus flux, associated with each different character is unique, the waveform derived for each different character uniquely identifies that character.

To simplify the timing of the waveform analysis process, the characters are provided with stylized geometric features which impart anticipatable timing characteristics to the derived waveforms. Thus, in accordance with this scheme for reader identification, each character of the E-13B font is divided into a predetermined number of vertical segments corresponding to the location of bar portions of the character. The characters are designed such that the distribution of ink undergoes significant change only at the boundaries between each segment. Hence, peak fluctuations in the derived waveform caused by these variations in ink distribution can occur at only predetermined times during the character scan.

Prior character recognition systems have utilized the amplitudes of each of the peaks of the generated waveform for correlating with known peak amplitude characteristics of each of the E-13B characters to identify the character read. An example of this type of recognition system may be found in U.S. Pat. No. 3,851,309. Critical to this type of recognition system is the timing of the sampling of the waveform for detecting the occurrence of each of the peaks in the waveform. It is well known that in the actual printing of the magnetic character on the document, variations in width of the bar portion of the characters are obtained which affect the peak amplitude of the waveform. Other errors found in the reading of the magnetic characters can be traced to variations in the speed of the document past the read head thereby displacing the peak position of the waveform with respect to the vertical segment in which the peak amplitudes of the reference characters are measured and used in recognizing the unknown character. Prior art recognition systems have been eveloped to compensate for these variations. In U.S. Pat. No. 3,528,058, issued to Bond, each peak in the waveform of the unknown character is sensed for controlling the generation of the next window during which time the next peak of the waveform is to be sensed. In U.S. Pat. No. 3,629,829, issued to Ordower, each peak in the unknown character is integrated over a predetermined time span for generating a value which is used in recognizing the unknown character, which value is not affected by registration or gross distortion of the input waveform. Difficulties arise using these systems in those cases where the peak curve in the waveform of the unknown character are skewed or unsymmetrical. Using the prior art peak detection systems, the timing of windows generated in response to the sensing of the prior peak amplitude fail to completely cover the peak curve resulting in the generation of a value not representing the total area of the peak. In those cases where the distortion of the waveform results in a multi-peak waveform, complex timing circuits are required to select which peak is the required peak for use by the system in generating a peak amplitude value.

It is therefore an object of this invention to provide a character recognition system which generates a high degree of successful recognition operations under present-day operating conditions. It is a further object of this invention to provide a character recognition system which functions independently of the speed of the characters past the read head. It is another object of this invention to provide a character recognition system which minimizes the effects of variation in ink intensity found in the characters that are to be read. It is a still further object of this invention to provide a character recognition system which consists of a smplified system and circuitry which can be installed at a relatively low cost.

SUMMARY OF THE INVENTION

These and other objects are fulfilled by providing a magnetic character reader system in which the ink intensity of the printed magnetic character is normalized by rectifying and integrating the analog waveform generated by the magnetic head passing over a printed magnetic character to produce a value which is used as the gain of a programmable analog amplifier to output a normalized waveform. To compensate for variation in the speed of the transport, the center of gravity of the area of each peak is generated for use in controlling the start of a plurality of windows for orientating each peak of the waveform within its required window. The area under each peak in the waveform is then digitized and compared with corresponding values of a plurality of reference characters for generating a value representing the difference between the values. The character represented by the minimum value of the differences is selected as that character read by the read head.

BRIEF DESCRIPTION OF THE DRAWINGS

The foregoing and various other objects, advantages, and meritorious features of the present invention will be apparent from the following detailed description and appended claims when read in conjunction with the drawing, wherein like numerals identified corresponding elements.

FIGS. 1A and 1B taken together disclose a block diagram of the character recognition system in accordance with the present invention.

FIG. 2 is a schematic representation of an idealized analog waveform generated by a magnetic read head;

FIG. 2A is a schematic representation of the idealized windows which are used by the system for sensing the peaks in the waveform showing the location of the windows with respect to analog waveforms of FIG. 2.

FIG. 3 is a schematic representation of the analog waveform of FIG. 2 which has been distorted due to variation in speed of the document past the magnetic read head;

FIG. 3A is a schematic representation of the windows generated in accordance with the present invention showing the location of the windows with respect to the analog waveform of FIG. 3.

FIG. 4A is a diagram of the various pulses generated during the operation of the reader system.

FIG. 10 is a table showing an example of the absolute values of the unknown normalized character read by the magnetic read head.

FIG. 11 is a table showing an example of the absolute values of the normalized reference characters stored in the ROM unit and which are subtracted from the absolute values of the unknown normalized character for use by the minimum selection network of FIG. 9 to select the character corresponding to the unknown character.

DESCRIPTION OF THE PREFERRED EMBODIMENT

Figure 1B:
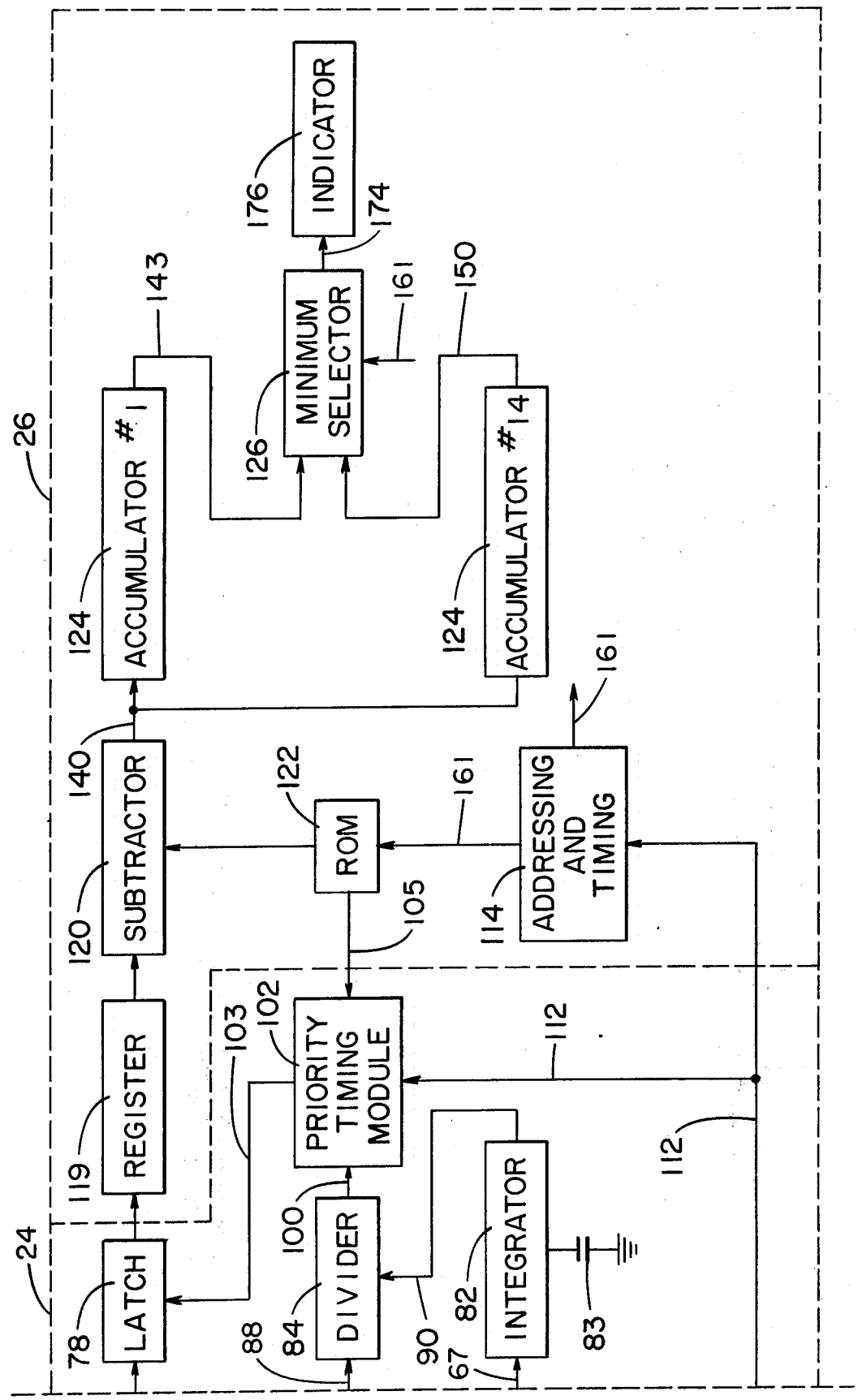

Referring now to FIGS. 1A and 1B, there is shown a block diagram of the character recognition system embodying the present invention. The system is divided into four sections, the section designated by the numeral 20 containing that portion of the system which generates and amplifies the analog waveform representing the unknown character, section 22 which modifies the analog waveform to compensate for variations in the ink intensity of the unknown character by rectifying and integrating the amplitude of the analog waveform and normalizing the waveform in accordance with the integrated value, section 24 which controls the generation of the windows so as to compensate for variation in speed of the character past the read head, and section 26 which is directed to the recognition of the unknown character by correlating values representing the unknown character with known values of a plurality of reference characters.

The present system includes a single gap magnetic read head 28 (FIG. 1A) of well-known construction, which is positioned adjacent the path of movement of a document having characters such as the character 30 printed thereon in magnetic ink. While the characters 30 are printed in the form of the E-13B character font which has been adopted by the American Bankers Association for use in banking checks in this country, it is obvious that the recognition system of the present invention can be used with any character font which results in a unique analog waveform when scanned by the magnetic read head 28. Movement of the character 30 past the magnetic read head 28 results in the generation of an analog electrical signal corresponding to the time derivative of the change in flux of the magnetized ink, such signal being represented by the analog waveform 32 in FIG. 4. The analog waveform 32 is transmitted from the read head 28 to a pre-amplifier 34 for transmission to a plurality of logic modules which includes a Delay module 36, a Character Start module 38, a Peak Detector module 40 and a Rectifier module 42.

Figure 4:
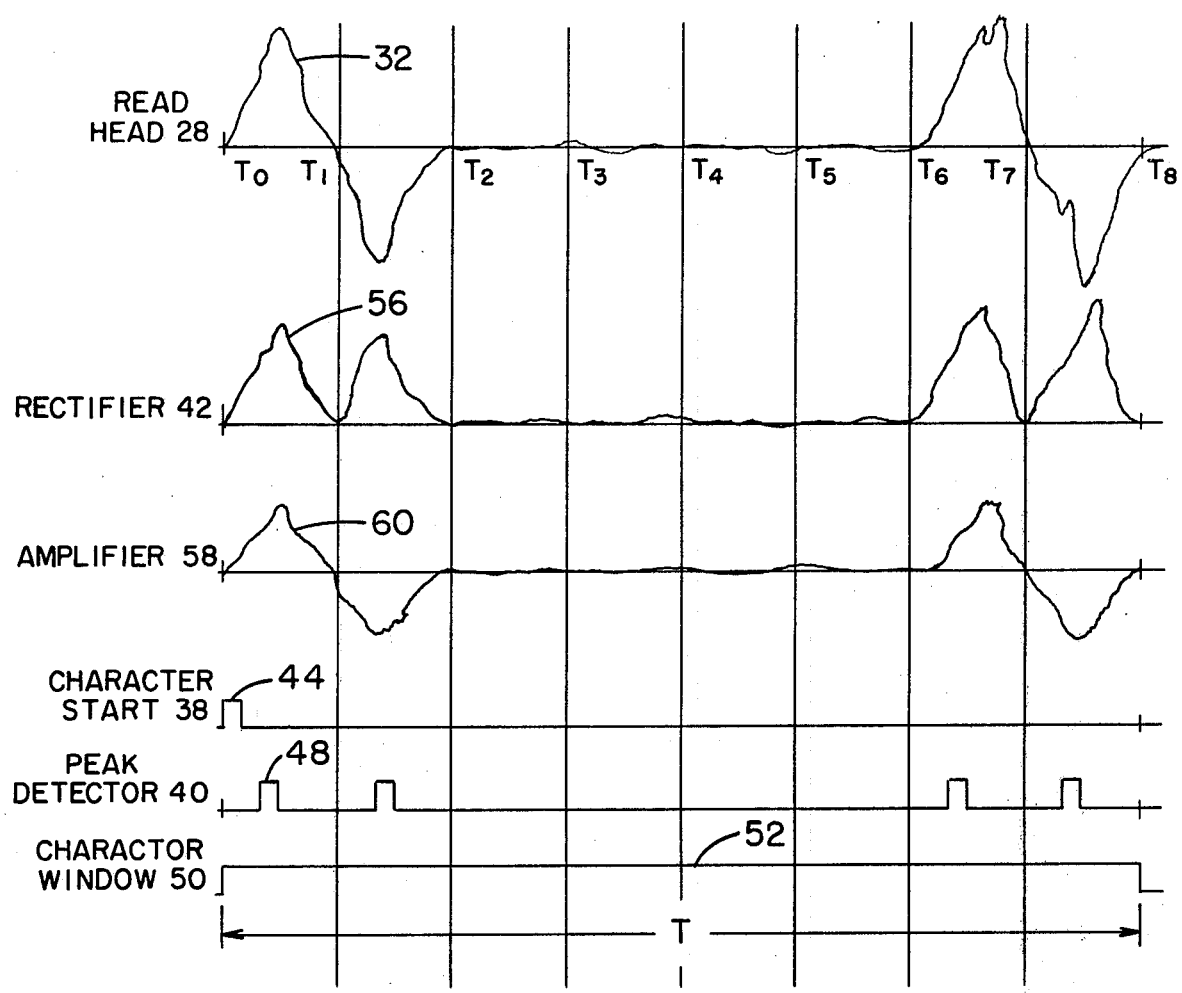
FIG. 4 is a diagram illustrating the actual analog waveform of a character read by the read head together with the various waveforms generated during the operation of the reader system.

The Delay module 36 (FIG. 1A) is of well-known construction and stores the analog waveform 32 (FIG. 4) for one character time T. The Character Start module 38 detects the positive going edge of the analog waveform 32 after applying a threshold value to the waveform 32 (FIG. 4). An example of a circuit which may be utilized in the present embodiment is disclosed in the co-pending application of Robert Nally, entitled "Character Recognition Apparatus", Ser. No. 846,877 filed on the same day as this application and assigned to the present assignee. If the voltage level of the waveform is greater than the threshold level applied by the Character Start module 38, a digital pulse 44 (FIG. 4) will be outputted to an AND logic gate 46 whose other input is connected to the output of the Peak Detector module 40. The Peak Detector module 40 is of well-known construction and functions to detect the time of occurrence of each peak in the waveform 32 (FIG. 4). Upon detecting the first peak in the waveform 32, the Peak Detector module 40 will output a pulse 48 (FIG. 4) to the AND logic gate 46 enabling the gate to output a pulse to a Character Window Generator module 50 which opens a window 52 shown in FIG. 4 extending over the length of time T the character waveform 32 is generated by the read head 28. An example of a Character Window Generator module that may be used can be found in FIG. 3 of the previously-cited Nally co-pending application.

The output of the Character Window Generator module 50 is connected to an Integrator module 54 which integrates the rectified waveform 56 (FIG. 4) outputted by the Rectifier module 42. The Rectifier module 42 rectifies the analog waveform 32 received from the pre-amplifier 34 to produce a plurality of positive amplitude portions 56 (FIG. 4), which amplitude portions are integrated by the Integrator module 54 for the time period T of the character window 52 (FIG. 4) generated by the Character Window Generator module 50. The Integrator module 54 outputs a voltage signal which is transmitted to a Programmable Gain Analog Amplifier module 58. The Amplifier module 58 is programmed to reduce the amplitude of the analog waveform 32 (FIG. 4) received from the Delay module 36 if the voltage signal received from the Integrator module 54 is high, and to increase the voltage amplitude of the analog waveform 32 if the voltage signal from the Integrator module is low. Thus, the function of the Amplifier module 58 is similar to an analog divider wherein the voltage of the waveform is divided by the voltage gain from the Integrator module 54. The resulting analog waveform 60 (FIG. 4) outputted from the Amplifier 58 represents the analog waveform of a character having an ink intensity level of 100% for every character 30 (FIG. 1A) that is read by the read head 28. Thus, section 22 of the present character recognition embodiment will equalize the voltage of the waveform with respect to the ink intensity of the character read such that if the ink intensity is low due to printing conditions, the output of the Amplifier module 58 will be the same as in the case where the ink intensity is high due to a very heavy printing condition. An example of a commercially-available Programmable Gain Analog Amplifier module that may be used in this embodiment is the Burr-Brown Amplifier module 3602 while Evans Associates Company Integrator module 4130 is an example of an integrator module that may be used for the Integrator module 54.

The analog waveform 60 (FIG. 4) outputted from the Programmable Gain Analog Amplifier module 58 (FIG. 1A) is transmitted over conductor 62 to an Integrator module 64 (FIG. 1A) which includes an integrating capacitor 65 and to an Analog Multiplier module 66 for controlling the timing of the start of the windows which are used by the system for detecting characteristics of the peaks in the waveform 32 (FIG. 4) in order to carry out the character recognition operation.

As shown in FIG. 2, an ideal analog waveform 68 representing each character of the E-13B font will have a plurality of clearly defined peak portions 70. Each E-13B character is designed to provide up to eight peaks in the waveform, wherein peak occurs at a discreet time with respect to the start of the generation of the waveform. Each discreet time is represented in a manner well-known in the art by a window 72 (FIG. 2A) within which each peak is centrally located. As shown in FIG. 2A, each of the windows 72 is generated to include the start of each of the peak curves where the voltage is at 0 volts, with the identifying characteristics of the E-13B reference characters being based on such occurrence. The numerical values disclosed hereafter utilized in identifying each of the reference characters represent the area under each peak in the analog waveform located within a specified window. Since these values are determined based on the peak being centrally located within its associated window, any deviation in the location of the peak within the window will reduce the area of the peak sensed and therefore reduce the accuracy of the correlation. FIG. 3 shows the same analog waveform 68 distorted with respect to the window 72 due to a decrease in speed of the printed magnetic character 30 past the magnetic read head 28 (FIGS. 1A). If the system utilized the windows 72 (FIG. 2A) to sense the peak 74 of the waveform 75 shown in FIG. 3, it is obvious that the start of each of the windows 72 would not coincide with the start of each peak 74 with the result that the correlation between the unknown character using data based on that portion of the peak 74 within the window 72 and the reference characters would not produce the accuracy of recognition that is desired.

In order to overcome this problem, the present invention contemplates generating the windows 76 (FIG. 3A) associated with each peak 74 in the waveform 75 of FIG. 3 based on the location of the center of gravity CG (FIG. 3) of the area of the previous peak in order to vary the timing width of the windows to include the total peak curve of the waveform. The location of the center of gravity CG of each peak 74 (FIG. 3) can be determined in accordance with the following general equation;

$$CG_1 = \frac{\int_{T_0}^{T_1} v(t) \times T(dt) \, (A)}{\int_{T_0}^{T_1} v(t) \, dt \, (B)}$$

where $T$ = Time Zone of Window

Referring to FIG. 2A, it will be seen that the center of gravity CG of each idealized peak 70 (FIG. 2) is located at a point equal to $\frac{1}{2}T$ where T is the time zone of the window 72. To allow for the start of the next window 72, a reset portion R of the window 72 is provided, R being equal to the term (1-K)T where K is an arbitrary portion of T. In the present embodiment, K is selected to be equal to 7/8T. As further shown in FIG. 3A, to compensate for the distortion of the waveform 68 of FIG. 2 due to variation in speed of the transport, the start of the generation of each window 76 is based on the determination of an incremental center of gravity CG represented by $T_1$ in FIG. 3A which is equal to the difference between the location of the center of gravity $CG_1$ of the distorted peak 74 of FIG. 3 to the location of the center of gravity CG of the normal peak 70 of FIG. 2. Using the value of T and $CG_1$, the time $T_1$ (FIG. 3A) which starts the generation of the next window 76 is found in accordance with the following equations:

(2) $T_1 = KT + R_1$
where $K = \frac{7}{8}$
(3) $R_1 = (1-K)T + \Delta T_1$
$= \frac{1}{8}T + \Delta T_1$
If $\Delta T_1 = CG_1 - \frac{1}{2}T$, then equation (3) becomes
$R_1 = \frac{1}{8}T + CG_1 - \frac{1}{2}T$
(4) $= CG_1 - \frac{3}{8}T$, then equation (2) becomes
(5) $T_1 = \frac{7}{8}T + CG_1 - \frac{3}{8}T$ or
(6) $T_1 = \frac{1}{2}T + CG_1$ Thus, the start of the next window is a function of the center of gravity $CG_1$ of the area under the previous peak curve. The present embodiment discloses circuitry for generating the value of $T_1$ in accordance with equation (5).

As described previously with respect to FIG. 1A, the analog waveform output 60 (FIG. 4) of the Analog Amplifier 58 representing the unknown character 30 is transmitted to the integrator module 64 and the Analog Multiplier 66. The integrator module 64 comprises timing control circuits for controlling the operation of the integrating capacitor 65 for integrating the waveform 75 (FIG. 3) for the time of K which in the present embodiment is equal to 7/8 T. The output of the Integrator module 64 will represent the term (B) of Equation 1 while the output of the Analog Multiplier module 66 over conductor 67 will represent the product of the analog values of the input waveform 60 and the time T of the latch windows 72 (FIG. 2) which in the present embodiment is 125 micro-seconds representing a speed of 104 in/sec.. The value of time T is generated in a Ramp Generator module 80. The output of the Analog Multiplier module 66 is transmitted over conductor 67 to an Integrator module 82 (FIG. 1B) which includes an integrating capacitor 83 whose output over conductor 90 will represent the term (A) of Equation 1. The outputs of Integrator module 82 and Integrator module 64 are transmitted to an Analog Divider network 84 (FIG. 1B) which will produce an output representing the center of gravity $CG_1$ (FIG. 3A) of the areas under each of the peaks 74 (FIG. 3A) of the analog waveform 75 as defined by equation (1).

Figure 5:
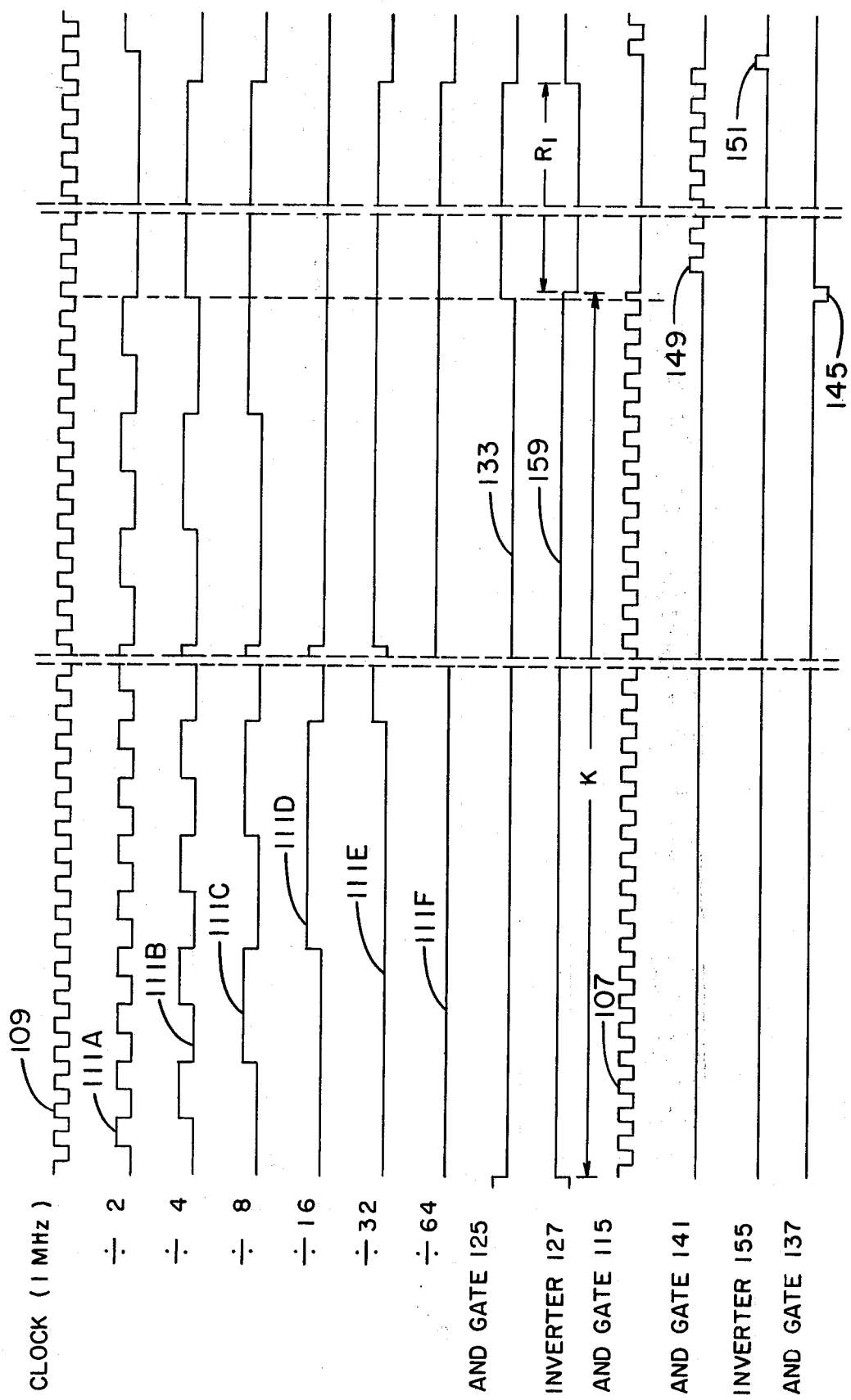
FIG. 5 is a logic diagram of the Analog Divider network of FIG. 1A.

A circuit for the Analog Divider module 84 which may be utilized in the present embodiment is shown in FIG. 5 and includes an Analog Multiplier 86 for receiving over the conductor 88 the output of the Integrator module 64 representing the term (B) of equation (1) and the output of an Operational Amplifier 92 over conductor 94. The output of the Multiplier 86 transmitted over conductor 96 is subtracted from the output of the Integrator network 82 representing the term (A) of equation (1) and received over conductor 90, which difference is inputted into the Operational Amplifier 92 whose output over conductor 100 is the center of gravity $CG_1$ of the areas of the peak 74 in the waveform. An example of a commercially-available Analog Multiplier that may be used includes a Motorola multiplier MC1594L, while the Operational Amplifier 92 may be a Motorola amplifier MC1741G. The circuit shown in FIG. 5 is more fully disclosed on page 9-37 of the Integrated Circuit Data Book, Supp. 2, published April, 1969 by Motorola Semiconductor Products Inc.

Figure 6:
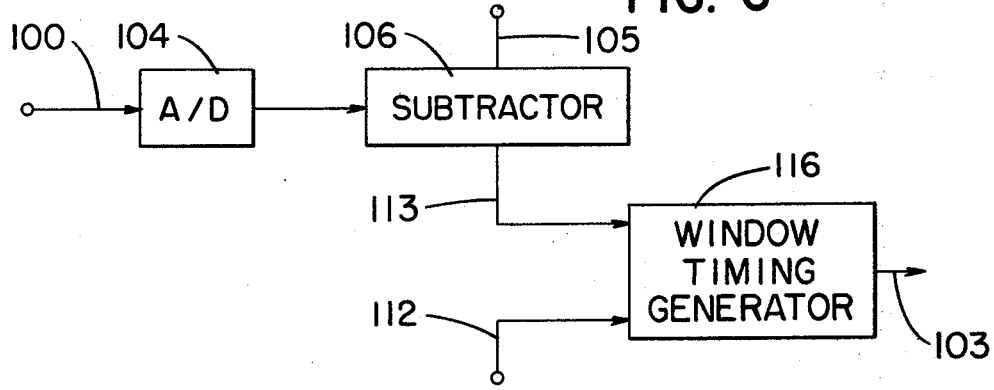
FIG. 6 is a logic diagram of the Priority Timing network of FIG. 1B.

The output of the Divider network 84 representing the center of gravity $CG_1$ (FIG. 3A) of the peak 74 (FIG. 2) is transmitted over conductor 100 to a Priority Timing module 102 (FIG. 1B). The function of the Priority Timing module 102 is to generate a series of timing signals $T_1$ (FIG. 3A) for transmission to the latch 78 (FIG. 1A) over conductor 103 for controlling the start of each of the windows 76 (FIG. 3A) in accordance with equation (5) utilizing the center of gravity of the previous peak 74 in the waveform 75 (FIG. 3). The Priority Timing module 102 is shown in FIG. 6 and includes an Analog/Digital Converter Module 104 which receives over the conductor 100 from the Divider module 84 (FIG. 1A) the analog value representing the center of gravity $CG_1$ of the peak 76 (FIG. 3A) and a Subtractor module 106 which subtracts a digital value representing three-eighths (⅜) of the time T from a digital value representing the center of gravity to produce the term $R_1$ in accordance with equation (4). The output of the Subtractor 106 representing the term $R_1$ (FIG. 3A) is then transmitted over conductor 113 to a Window Generator module 116 which adds to the output of the Subtractor 106 the value seven-eighths (7/8) of the time T representing the term K (FIG. 3A) in accordance with equation (5) to produce the timing signal $T_1$ (FIG. 3A), which signal sets the latch 78 for sampling the next peak portion 74 of the waveform 75. The clock pulses used in generating 7/8 T are transmitted from a timing network which includes a 1 Mhz Oscillator 108 (FIG. 1A) outputting clock pulses 109 (FIG. 4A) and a Signal Converter module 110 (FIG. 1A) for outputting a plurality of timing signals over conductor 112 to the Priority Timing module 102 and to an Addressing and Timing module 114 which outputs timing signals over conductors 161 for controlling the operation of the modules in the character recognition system in a manner well-known in the art. The digital value equal to ⅜ T may be transmitted over conductor 105 from a ROM storage unit 122 (FIG. 1B) or from ground and the power supply (not shown) to the Subtractor 106 (FIG. 6) while the clock pulses 109 (FIG. 4A) are transmitted over conductor 112 to the Window Generator module 116.

Figure 12:
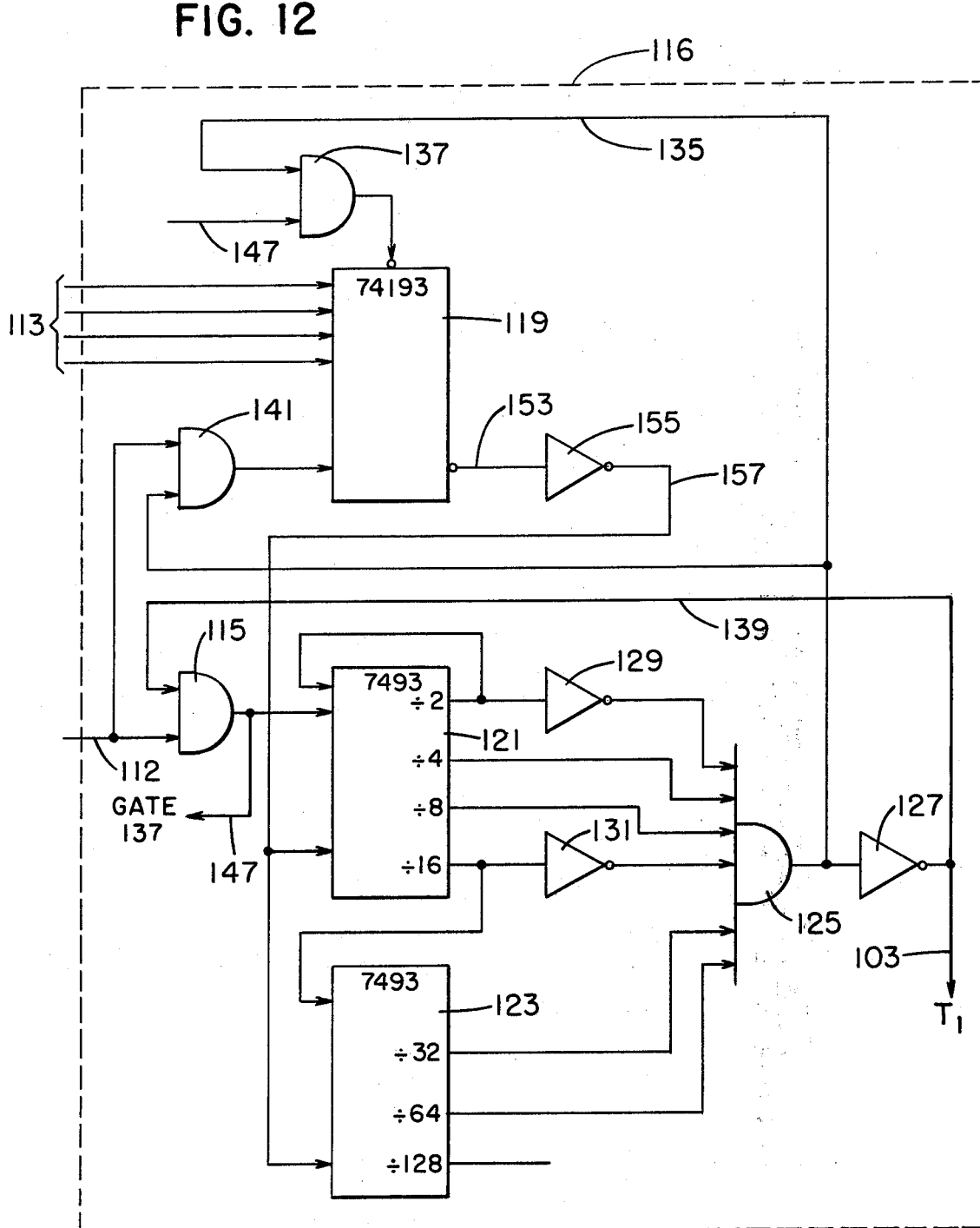
FIG. 12 is a logic diagram of the Window Timing Generator of FIG. 6.

Referring now to FIG. 12 there is shown a logic diagram of the Window Generator module 116 which includes a 4 bit 74193 Binary Up/Down Counter 119, and two 4 bit 7493 Binary Counters 121, 123. The clock pulses 109 (FIG. 4A) received over conductor 112 from the Converter module 110 (FIG. 1A) are transmitted to AND gates 115 and 141. At time $T_0$ (FIG. 4), AND gate 115 is enabled to output clock pulses 107 (FIG. 4A) to the Binary Counter 121 while AND gate 141 is disabled. Since the time zone T (FIG. 2A) of the window 72 has been selected at 125 us, seven-eighths (7/8) T will be 108 us. The clock pulses 107 (FIG. 4A) will count counters 121 and 123 up producing the output pulses 111A-111F (FIG. 4A) which are transmitted to AND gate 125 (FIG. 12) whose output is fed to an inverter 127 the output of which is the timing pulse 159 (FIG. 4A) transmitted over conductor 103 to the latch 78 (FIG. 1B) which opens the window 76 (FIG. 3A). During the time the counters 121, 123 are counting up to 108 pulses, the AND gate 125 will be disabled thereby resulting in the inverter 127 outputting the pulse 159 (FIG. 4A) which constitute the time K (FIG. 3A). Upon outputting the 108th clock pulse, the output of the counters 121, 123 through the inverters 129, 131, will enable the AND gate 125 whose output pulse 133 (FIG. 4A) will go high thereby turning off the pulse 159 resulting in the disabling of AND gate 115 and the enabling of AND gates 141, 137 over conductor 135 (FIG. 12).

The enabling of AND gate 137 will output a single pulse 145 (FIG. 4A) prior to the disabling of AND gate 115 whose clock output is inputted to AND gate 137 over conductor 147. The output pulse 145 is inverted when applied to the Up/Down counter 119 thereby loading the 4-bit preset value of $R_1$ into the counter 119 over conductors 113 as received from the Subtractor module 106 (FIG. 6). Enabling of AND gate 141 will output the clock pulses 149 (FIG. 4A) which counts down the counter 119 for the time of the preset value $R_1$ after which a pulse 151 (FIG. 4A) is outputted from the inverter 155 derived from a pulse received from the counter 119 over conductor 153. The pulse 151 is transmitted over conductor 157 for resetting the counters 121, 123 wherein the output of AND gate 125 will be low and the output of Inverter 127 goes high thereby enabling AND gate 115 to clock the counters 121 and 123 for the generation of the next window 76 (FIG. 3A). If equation (6) is utilized to generate the timing signals $T_1$, the digital value of ⅜ T will be added to the digital value of $CG_1$ to provide the timing signals $T_1$ for the generation of the next window 76.

The output of the Integrator module 64 (FIG. 1A) representing the area under the peak 74 (FIG. 3) is transmitted over conductor 117 to an Analog/Digital Converter module 118 which digitizes the integrated value for transmission to the latch 78 which senses that portion of the digital output representing the peak curve 74 in accordance with the timing signals transmitted over conductor 103 from Timing module 102 (FIG. 1B). The digital value stored in the latch 78 is outputted in the form of eight bit parallel data to the eight bit Shift Register 119 (FIG. 1B) for storage therein. The digital values stored in the Shift Register 119 represent the area under each of the peak curves 74 (FIG. 3) sensed during the opening of its associated window 76. This data representing a feature characteristic of the character represented by the waveform 32 (FIG. 4) is then transmitted to a Subtractor module 120 which also receives from the ROM storage unit 122 eight bit data representing the area under the peak curve sensed in a corresponding window of each of fourteen reference characters. The difference between each of the digital values stored in the Shift Register 119 and the corresponding digital value of each of the reference characters is outputted to a plurality of fourteen Accumulator modules 124 which will sum the differences found in each window for each of the fourteen reference characters. The output of each of the Accumulator modules 124 is then transmitted to a Minimum Selecting module 126 which will select the two minimum values of the total differences stored in the Accumulator modules 124 for use in selecting the character represented by the waveform 32 (FIG. 4) generated by the read head 28. The Minimum Selecting module 126 applies a pair of threshold values to the minimum values selected to determine if a valid recognition operation can be obtained in view of the waveform generated by the read head 28. The character selected is then indicated in an Indicator module 176.

Figure 7:
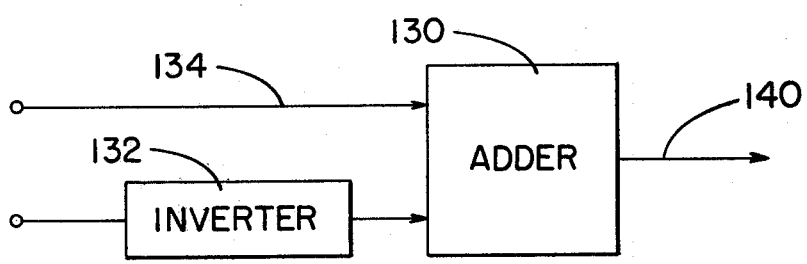
FIG. 7 is a logic diagram of the Subtractor network of FIG. 1B.

Referring to FIG. 7 of the drawing, there is shown a circuit diagram of the Subtractor module 120 (FIG. 1B) which includes a Binary Adder 130 and an Inverter module 132. The Adder 130 receives over conductor 134 the eight bits of data from the shift register 119 while the Inverter 132 receives from the ROM 122 eight bits of data representing the reference character. The Inverter network 132 will invert the data inputted from the ROM unit 122 (FIG. 1B) and transmits this inverted data to the adder 130 which outputs a value over conductor 140 representing the difference between the data inputted on the conductor 134 and the data inputted from the Inverter network 132. An example of a commercially-available adder that may be used is that of Signetics adder SN 7483A while the Inverter network may be Signetics inverter SN 7404. To insure that the output value of the adder 130 is always absolute, the most significant bit connection is not outputted.

Figure 8:
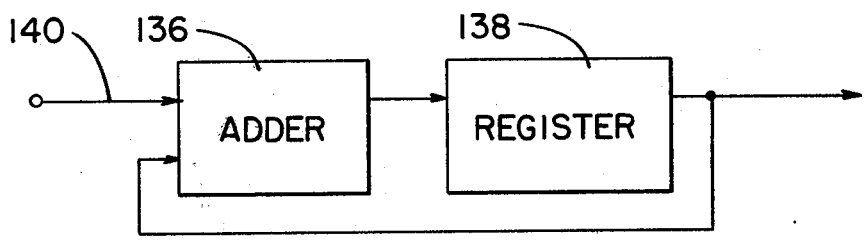
FIG. 8 is a logic diagram of the Accumulator network of FIG. 1B.

Referring to FIG. 8 of the drawing, there is shown a circuit diagram of the Accumulator module 124 which includes a Signetics SN 7483A Binary Adder 136 together with a Signetics SN 74174 Shift Register 138. Each seven bit value transmitted from the Subtractor module 120 will be inputted over conductor 140 into the Adder 136 whose output is then shifted to the Register 138. The output of the Register 138 is then fed back to the Adder 136, thereby accumulating each of the eight values representing the difference between the area under the peak in each of the eight windows of the unknown character and one of the fourteen reference characters. As each difference value is inputted over conductor 140 into the adder 136, the output of the shift register 138 will be equal to the sum of the differences inputted into the adder 136 at that time.

Figure 9:
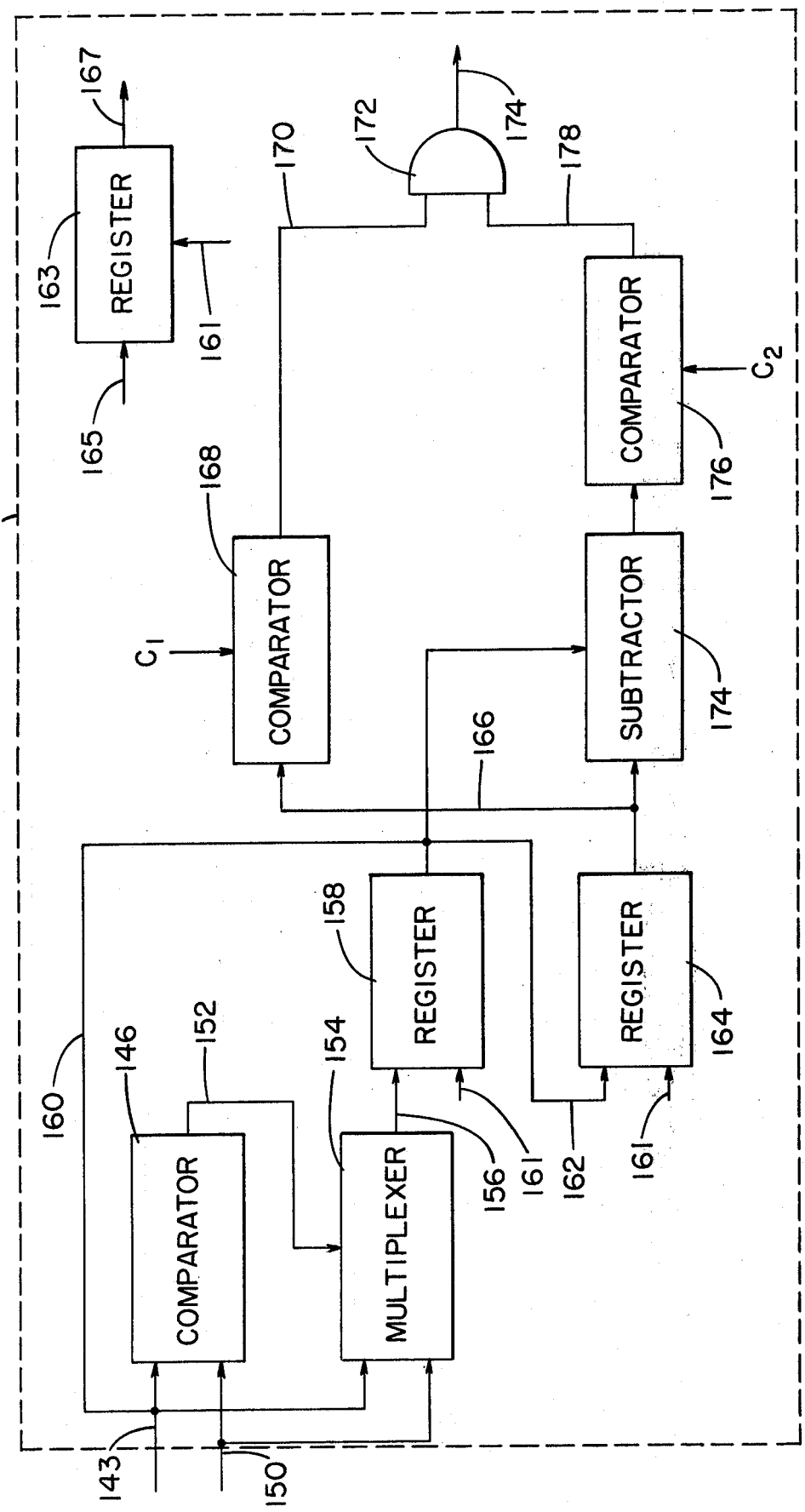
FIG. 9 is a logic diagram of the Minimum Selection network of FIG. 1B.

Referring now to FIG. 9 of the drawing, there is illustrated the circuit of the Minimum Selector module 126 (FIG. 1B) which includes a Comparator 146, which compares two eight bit data words received over conductors 143, 150 representing the output of two of the Accumulators 124. The Comparator 146 outputs a signal over conductor 152 indicating which input is less than the other input, which signal is transmitted over the conductor 152 to a Multiplexer 154 which receives the two input words over conductor 143, 150 and will output the eight bit word representing the minimum value of the two input words in accordance with the level of the signal outputted from Comparator 146. This minimum value eight bit word is then transmitted over conductor 156 to a shift register 158 for storage therein under the control of timing signals received from the Timing module 114 (FIG. 1B) over conductor 161. The value stored in the register 158 is then fed back over conductor 160 to conductor 143 for inputting into the comparator 146 which will compare this value with the next output value inputted over conductor 150 and stored in the Accumulators 124. This procedure is then repeated for each of the remaining values stored in the Accumulators 124 resulting in the storing in the register 158 at the end of the comparator operation of a value $M_1$ representing the minimum value of the values stored in the Accumulators 124. This value is then transmitted over conductor 162 to the Shift Register 164 for storage therein. A Shift Register 163 receives a 4-bit binary word representing the Accumulator 124 whose output is being compared in Comparator 146, the Register 163 being enabled by timing signals received over conductor 161 from the Timing Module 114 (FIG. 1B) for outputting over conductor 167 a 4-bit word indicating the identity of the Accumulator 124 associated with $M_1$ for use in displaying in the Indicator module 176 the recognized reference character corresponding to $M_1$. The comparing of the remaining 13 values stored in the Accumulators 124 is then repeated, resulting in the storing of the next minimum value $M_2$ in the Shift Register 158. The output of the minimum value $M_1$ stored in the Register 164 is then outputted over conductor 166 to a Comparator 168 which compares the minimum value $M_1$ with a threshold constant $C_1$. If the minimum value is less than the constant $C_1$, a signal is transmitted over conductor 170 to an AND gate 172. The minimum value $M_1$ and the next minimum value $M_2$ stored in the Registers 164 and 158 respectively are transmitted to a Subtractor 174 which outputs a value ($M_2$-$M_1$) to a Comparator 176 representing the difference between the input values, which difference is then compared with a second constant value $C_2$ in the Comparator 176. If the difference ($M_2$-$M_1$) is greater than the Constant $C_2$, a signal will be outputted over conductor 178 to enable the AND gate 172 which outputs a signal over conductor 174 for use together with the 4-bit word outputted from the Register 163 over conductor 167 indicating the reference character corresponding to the minimum value output of one of the Accumulators 124 (FIG. 1B) in indicating in the Indicator module 176 (FIG. 1B) the character represented by the minimum value $M_1$ as the character read by the read head 28. The Comparators 146, 168, and 176 may be a Signetics SN 7485, the Multiplexer 154 may be a Signetics SN 74157, while the shift registers 158, 163 and 164 may be Signetics SN 74174.

In the operation of the system, the magnetic read head 28 (FIG. 1A) generates the waveform 32 (FIG. 4) which is then transmitted to the Delay module 36 for storing the analog waveform 32 for one character time. The analog waveform 32 is also transmitted to the Character Start module 38 which will apply a threshold value for determining if the voltage of the waveform 32 is sufficiently large to be a character and not noise or some other type of invalid character start voltage. The analog waveform 32 is also transmitted to the Peak Detector module 40 which detects the first peak in the waveform, thereby enabling the Character Window Generator 50 to open a window 52 (FIG. 4) which extends for the length of time that the waveform 32 is generated. The analog waveform 32 is also transmitted to the Rectifier module 42 which will rectify the analog waveform and transmit the resulting rectified analog waveform 56 (FIG. 4) to the Integrator module 54 which integrates the rectified waveform 56 for the length that the character window 52 is generated by the generator 50. The output of the Integrator module 54 is then applied to the Programmable Amplifier 58 which amplifies the analog waveform 32 transmitted from the Delay network 36 to produce an analog waveform 60 (FIG. 4) whose peak amplitudes represent an ink intensity equivalent to an 100% output level. Thus, each waveform 32 generated by the read head 28 will be outputted from the Amplifier 58 at the same ink intensity level.

The waveform 60 (FIG. 4) outputted from the Amplifier 58 is transmitted to the Integrator module 64

(FIG. 1A) and the Analog Multiplier 66 for use in generating a number of windows 76 (FIG. 3A) whose length will be selected to compensate for the variation in speed of the unknown magnetic character 30 (FIG. 1A) past the read head 28. The Analog/Digital converter 118 digitizes the rectified waveform 60 (FIG. 4) outputted from the Integrator module 64 from which the digital waveform is transmitted to the Latch 78. The center of gravity of each of the areas under the peaks 74 (FIG. 3) in the waveform 75 is generated by the Analog Divider 84 (FIG. 1B) which divides the integration of the waveform 60 (FIG. 4) received from the Integrator module 82, by the integration of the waveform 60 received from the Integrator module 64. The output of the Divider 84 is transmitted over conductor 100 to the Priority Timer module 102 wherein the timing of the start of the next window is initiated as a function of the center of gravity that was outputted from the Divider 84. The Priority Timer module 102 outputs the timing signals for opening each of the windows 76 (FIG. 3A), for generating in the Latch 78 a digital value representing the area under each of the peaks in the waveform 60 for use in recognizing the character represented by the waveform 32 (FIG. 4).

Each of the digital values generated in the Latch 78 (FIG. 1B) is transmitted to the Shift Register 119 for storage therein wherein subsequently the values are transmitted to the Subtractor module 120 which compares the values stored in the Register 119 with values stored in the ROM storage unit 122 representing the values of the areas under each of the corresponding peaks in the waveform of the reference characters. As shown in FIG. 10, the digital values stored in the Register 119 represent an absolute digital value corresponding to a predetermined window number. As further shown in FIG. 11, stored in the ROM storage unit 122 are corresponding values for each window number for each of the reference characters. The Subtractor module 120 will subtract from the digital value stored in the Register 119 a corresponding value for each window number in a reference character. Thus, for example, in subtracting the values represented by the reference character "0" from the values stored in the Register 119, the Subtractor module 120 will provide the following values; window #1, 30-26 = 4; window #2, -22-14-8, windows 3, 4, 5, and 6 will be 0, while window 7 will have a difference of 1, and window 8 will have a difference of a —4. These values for each reference character are then transmitted to one of the Accumulator modules 124 which sums up the total difference between the unknown character of each reference character. Thus, taking the example set out above, the Accumulator module 124 for the reference character "0" will be 17. This procedure will be repeated until all the Accumulator modules 124 have on their output a value representing the sum of the differences between its associated reference character and the character represented by the waveform 32 (FIG. 4). The values stored in the Accumulators 124 representing the total differences between the values generated in analyzing the waveform 32 (FIG. 4) and those representing each of the fourteen reference characters are compared in the Minimum Selecting module 126 which will generate digital values representing the two minimum values of all the values stored in the Accumulators 124. The lowest minimum value is then compared with a first threshold value, which threshold value requires that the minimum selected value be smaller than the threshold value. If the minimum selected value is greater than the first threshold value, it is assumed that the minimum value is such that a probability of error exists in the reading which would make the recognition of the character unacceptable under the circumstances and a signal indicating the status of the operation is outputted over the conductor 174 to an appropriate signalling device 176 indicating the status of the operation. The difference between the two selected minimum values is then compared to a second threshold value. If the difference is less than the second threshold value, it is doubtful that the data generated is of sufficient magnitude to provide a valid character recognition and therefore the recognition operation is terminated. If the difference is greater than the second threshold value, the character associated with the minimum value is then indicated in the indicator 176 as the selected character corresponding to the waveform 32 (FIG. 4).

While the preferred embodiment of the invention has been described in detail for recognizing characters in a standard E-13B character font, the character recognition system could be readily adapted by a person of ordinary skill in the art to recognize characters or symbols from any standard character font without departing from the spirit of the invention. Furthermore, many changes and details of the preferred embodiment may be made without departing from the spirit and scope of the present invention and, hence, such invention is not intended to be limited beyond that as required by the claims as defined in the appended claims.

What is claimed is:

1. In a character reading system wherein an analog voltage having a waveform unique to each character to be read is generated, said unique waveform including a sequence of varying peak amplitudes corresponding to the shape of the character being read, means for evaluating said waveform to derive signals representing feature characteristics of the character recognized comprising:
   a. means for generating timing signals defining a plurality of character scan segments each corresponding to a time of occurrence of one of said peak amplitudes;
   b. means operated in response to the generation of said timing signals for sampling said waveform during each scan segment to output a feature signal in accordance with the peak amplitude sampled;
   c. and means for generating an analog value representing the center of gravity of each of said peak amplitudes for use in controlling said timing generating means to output timing signals establishing the next succeeding character scan segment.

2. The character reading system of claim 1 wherein said analog value generating means includes first means for integrating said analog waveform to output a first integrated signal, said sampling means is connected to said integrating means for sampling said integrated signal, and said character reading system further includes a first storage means connected to said sampling means for storing said feature signal outputted from said sampling means in response to the generation of said timing signals.

3. The character reading system of claim 2 which further includes;
   a. a source of timing signals;
   b. second storage means for storing a first digital value representing a predetermined number of said timing signals;

c. and said timing signal generating means is coupled to said second storage means and to said analog value generating means for establishing the next succeeding character scan segment as a function of said analog and said first digital values.

4. The character reading system of claim 3 in which said timing signal generating means includes;
   a. means coupled to said analog generating means to convert said analog value to a second digital value;
   b. subtracting means coupled to said converting means and said second storage means for subtracting said first digital value from said second digital value;
   c. and segment timing means coupled to said source of timing signals and said subtracting means to output timing signals for establishing the next succeeding character scan segment as a function of the output of said subtractor means and said timing signals.

5. The character reading system of claim 4 in which said segment timing means includes;
   a. first counter means coupled to said source of timing signals and operated to output a predetermined count of said timing signals for establishing a portion of the character scan segment;
   b. and second counter means coupled to said source of timing signals and the output of said subtractor means for outputting a control signal which establishes the remaining portion of the character scan segment, said control signal operating said first counter means in accordance with the output of said subtractor means.

6. The character reading system of claim 5 in which said segment timing means further includes gating means coupled to said second counter means and to the output of said first counter means for gating a signal in response to the output of said predetermined count to preset said second counter means in accordance with the output of said subtractor means, said second counter means being operated to initiate the operation of said first counter means in accordance with the output of said subtractor means.

7. The character reading system of claim 6 in which said second counter means comprises an up/down counter.

8. The character reading system of claim 2 wherein said analog value generating means includes;
   a. a timing generator for outputting timing signals;
   b. an analog multiplier coupled to said timing generator and receiving said analog waveform for multiplying the analog voltage of said waveform by the time of occurrence of said analog voltage;
   c. second integrating means coupled to the output of said analog multiplier to integrate the output of said multiplier to output a second integrated signal;
   d. and divider means coupled to the output of said first and second integrating means to divide said second integrated signal by said first integrated signal to output an analog value representing the center of gravity of a predetermined portion of the area of said analog waveform.

9. The character reading system of claim 1 further including;
   a. means for integrating said waveform to output an integrated signal;
   b. and a variable gain amplifier receiving said analog waveform and connected to the output of said integrating means wherein said integrated signal controls the gain of said amplifier to output a normalized analog waveform whose amplitude is a function of the corresponding amplitude of said integrated signal.

10. A system for recognizing a unique analog waveform representing one of a plurality of unique reference characters comprising;
   a. means for generating an analog waveform representing an unknown unique character, said waveform having a sequence of varying peak amplitudes and a time of occurrence of same corresponding to a unique character;
   b. means responsive to the generation of said analog waveform for generating timing signals defining a plurality of predetermined character scan segments each corresponding to the time of occurrence of one of said varying peak amplitudes;
   c. means operated in response to the generation of said timing signals for sampling one of said peak amplitudes during each scan segment to output a feature characteristic in accordance with the peak amplitude sampled;
   d. means for generating an analog value representing the center of gravity of each of said peak amplitudes for use in controlling said timing generating means to output timing signals establishing the next succeeding character scan segment;
   e. first means for storing a plurality of reference feature characteristics representing corresponding feature characteristics of a plurality of unique reference characters;
   f. and means for comparing said feature characteristics with a corresponding reference feature characteristic of each unique reference character to produce an output indicating the unique reference character corresponding to the analog waveform.

11. The character recognition system of claim 10 further including;
   a. means for rectifying said unique analog waveform;
   b. means coupled to the output of said rectifying means for integrating said rectified waveform to output an integrated signal;
   c. and a programmable gain amplifier receiving said unique analog waveform and connected to the output of said integrating means wherein said integrated signal controls the gain of said amplifier to output an analog waveform whose amplitude is a function of the corresponding amplitude of said integrated signal.

12. The character recognition system of claim 10 wherein said analog value generating means includes;
   a. first means for integrating said analog waveform to output first analog integrated signals;
   b. said recognition system further including analog-to-digital converting means coupled to the output of said first integrating means to convert said first analog integrated signals to first digital values;
   c. said sampling means connected to said analog-to-digital converting means for sampling said first digital values during each scan segment to output second digital values representing a feature characteristic of the unique character recognized;
   d. and a second storage means connected to the output of said sampling means for storing said second digital values for use in producing an output indicating the unique reference character corresponding to the analog waveform.

13. The character recognition system of claim 12 which further includes;
   a. a source of timing signals;
   b. said first storage means further storing a third digital value representing a predetermined number of said timing signals;
   c. and said timing signal generating means is coupled to said first storage means and to said analog value generating means for establishing the next succeeding character scan segment as a function of said analog value and said third digital values.

14. The character recognition system of claim 13 in which said timing signal generating means includes;
   a. second means coupled to said analog generating means for converting said analog values to a fourth digital value;
   b. subtracting means coupled to said second converting means and said first storage means for subtracting said third digital value from said fourth digital value to output a fifth digital value;
   c. and segment timing generating means coupled to said source of timing signals and said subtracting means to output timing signals for establishing the next succeeding character scan segment as a function of the output of said subtracting means and said timing signals.

15. The character recognition system of claim 14 in which said segment timing generating means includes;
   a. first counter means coupled to said source of timing signals and operated to output a predetermined count of said timing signals which establishes the sampling portion of the character scan segment;
   b. and second counter means coupled to said source of timing signals and the output of said subtracting means for outputting a first control signal for establishing a reset portion of the character scan segment, said first control signal operating said first counter means to initiate the sampling portion of the next succeeding character scan segment.

16. The character recognition system of claim 15 in which said segment timing generating means further includes;
   a. first gating means coupled to the output of said first counter means and to said second counter means for gating a second control signal to said second counter means in response to said first counter means outputting said predetermined count to preset said second counter means in accordance with said fifth digital value;
   b. and second gating means coupled to the output of said first counter means for gating an operating signal to said second counter means in response to said first counter means outputting said predetermined count for operating said second counter means through a count equal to said fifth digital value, said second counter means outputting a third control signal for initiating the operation of said first counter means upon reaching a count equal to said fifth digital value.

17. The character recognition system of claim 16 in which said second counter means comprises an up-/down counter.

18. The character recognition system of claim 12 in which said comparing means includes;
   a. means coupled to said first and second storage means for subtracting each of said second digital values from a corresponding second digital value representing a feature characteristic of each reference character to output a third digital value;
   b. means for adding the third digital value of each reference character to output a fourth digital value representing each reference character;
   c. and second means for comparing each of said fourth digital values to derive the minimum fourth digital value corresponding to the reference character recognized.

19. The character recognition system of claim 10 wherein said analog value generating means includes;
   a. a timing generator for outputting timing signals;
   b. an analog multiplier coupled to said timing generator and said analog waveform generating means for multiplying the analog voltage of said waveform by the time of occurrence of said analog voltage;
   c. second integrating means coupled to the output of said analog multiplier to integrate the output of said multiplier to output a second integrated signal;
   d. an divider means coupled to the output of said first and second integrating means to divide said second integrated signal by said first integrated signal to output an analog value representing the center of gravity of an area under the analog waveform.

20. A character recognition system comprising:
   a. means for generating an analog waveform having a sequence of varying pack amplitudes representing an unknown character;
   b. means for generating timing signals defining a plurality of character scan segments each corresponding to a time of occurrence of one of said peak amplitudes;
   c. means operated in response to the generation of said timing signals for sampling said waveform during each scan segment to output a feature signal in accordance with the peak amplitude sampled;
   d. means for generating an analog value representing the center of gravity of each of said peak amplitudes for use in controlling said timing generating means to output timing signals establishing the next succeeding character scan segment;
   e. and means utilizing said feature signals to identify said unknown character.

21. A system for recognizing a unique multi-peak analog waveform representing one of a plurality of unique reference characters comprising:
   a. means for forming a plurality of first values each representing the area under each peak in the waveform;
   b. means for storing a plurality of second values each representing the area of a corresponding peak in a unique reference character;
   c. means for subtracting the first value of the analog waveform from the second values of the corresponding peak in each of the unique reference characters to generate a plurality of third values for each unique reference character;
   d. means for adding the third values of each unique reference character to output a fourth value;
   e. and means for selecting a unique reference character represented by the minimum fourth value as the character corresponding to the analog waveform.

22. A system for recognizing a unique multi-peak analog waveform representing one of a plurality of unique reference characters comprising:
   a. means for determining the center of gravity of the area under each peak in the waveform;

b. means for generating a timing signal representing the location of the start of the next peak in the waveform based on the center of gravity of the previous peak in the waveform;

c. means for sampling each peak in the waveform in accordance with the generation of said timing signals to form a first value representing the area under each peak in the waveform;

d. means for storing a plurality of second values each representing the area of a corresponding peak in the unique reference character;

e. means for subtracting the first value of the analog waveforms from the second values of the corresponding peak in each of the unique reference characters to generate a plurality of third values for each unique reference character;

f. means for adding the third values of each unique reference character to output a fourth value;

g. and means for selecting the unique reference character represented by the minimum fourth value as the character corresponding to the analog waveform.

23. A system for recognizing a unique multi-peak analog waveform representing one of a plurality of unique reference characters comprising:

a. means for rectifying said analog waveform;

b. means for integrating the rectified waveform to form a plurality of integrated signals;

c. means for normalizing the waveform by varying the amplitude of the waveform inversely proportional to the amplitude of the integrated signal;

d. means for integrating the normalized waveform;

e. means for sampling the peak portion of the integrated waveform to form a plurality of first values representing the area under each peak;

f. means for storing a plurality of second values each representing the area of a corresponding peak in a unique reference character;

g. means for subtracting the first values of the analog waveform from the second values of the corresponding peak in each of the unique reference characters to generate a plurality of third values for each unique reference character;

h. means for adding the third values of each unique reference character to output a fourth value;

i. and means for selecting a unique reference character represented by the minimum fourth value as the character corresponding to the analog waveform.

* * * * *